United States Patent Office 3,283,788
Patented Nov. 8, 1966

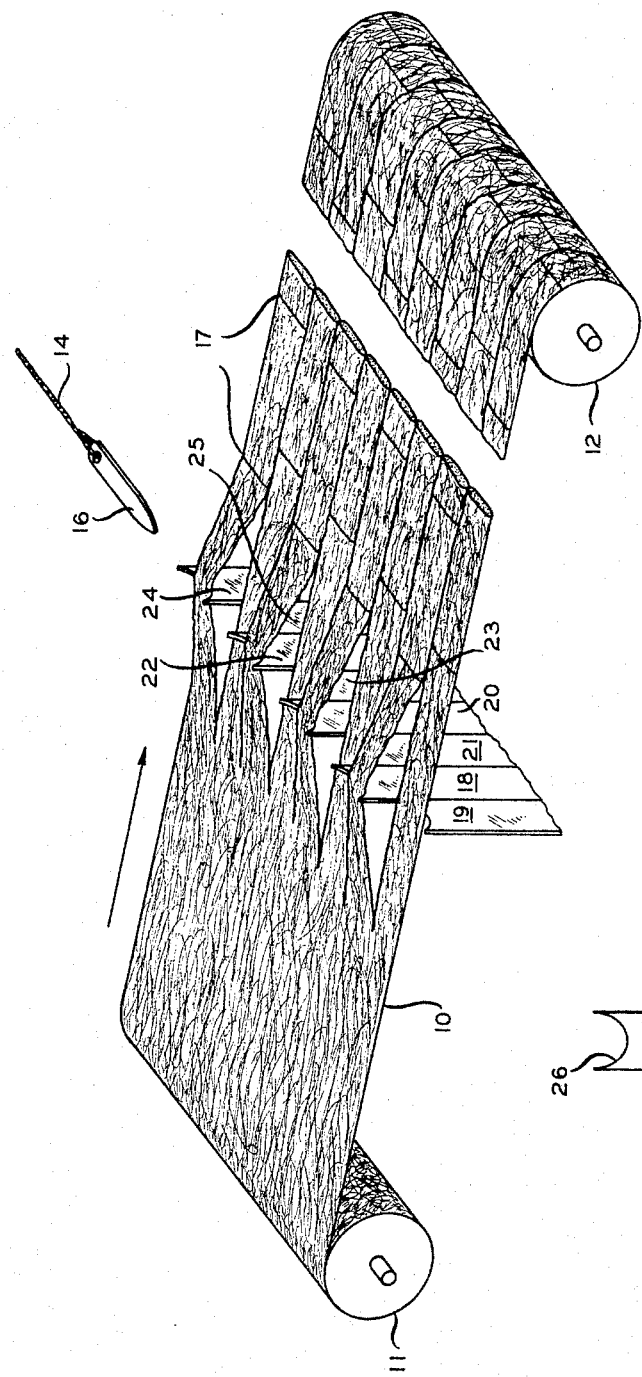

3,283,788
PRODUCTION OF WOVEN THERMOPLASTIC FABRICS
Anthony Bottomley, Maplewood, N.J., and David C. Bottomley, Bartlesville, Okla., assignors to Phillips Petroleum Company, a corporation of Delaware
Filed Apr. 7, 1964, Ser. No. 357,998
2 Claims. (Cl. 139—28)

This invention relates to the production of woven fabrics from split-fiber thermoplastic materials.

Conventionally in the weaving of fabric materials to provide a woven fabric, a warp formed of a plurality of spaced warp yarns is interwoven with a weft formed of a plurality of spaced weft yarns. Thus, threads, yarns, or filaments in a longitudinal direction are interlaced with threads, yarns, or filaments in a transverse direction.

Thermoplastic materials are becoming of increasing importance in the fabric industry. U.S. Patent 3,003,304 describes a method for producing non-woven fabrics and yarns utilizing thermoplastic materials. As woven fabrics are even of greater importance in the textile field, the use of thermoplastic materials in the textile field would be substantially increased by the provision of a satisfactory method for producing woven thermoplastic materials.

Accordingly, an object of our invention is to provide a process and apparatus for producing woven thermoplastic materials.

Another object of our invention is to provide a weaving process and apparatus therefor utilizing split-fiber thermoplastic materials.

Another object of our invention is to provide a woven fabric containing a split-fiber thermoplastic material.

Other objects, advantages and features of our invention will be readily apparent to those skilled in the art from the following description, the drawing and appended claims.

FIGURE 1 is illustrative of one embodiment of the invention.

FIGURE 2 is an elevated view of one of the separating fingers employed in FIGURE 1.

The thermoplastic materials employed in the process of our invention can be those thermoplastic materials prepared from the polymerization of 1-olefins having a maximum of 6 carbon atoms per molecule. The polymerization product can be a homopolymer or a copolymer, or a mixture thereof. Thus, the inventive process is applicable to polymers or copolymers of 1-olefins, such as ethylene, propylene, 1-butene, 1-pentene, 4-methyl-1-pentene, 3-methyl-1-butene, 3,3-dimethyl-1-butene, and the like, polymerized by any suitable procedure.

Thermoplastic materials of this invention also include those materials comprising a polymerized conjugated diene containing from 4 to 8, inclusive, carbon atoms per molecule. Examples of conjugated dienes which can be employed to produce the thermoplastic materials of our invention include 1,3-butadiene, 2-methyl-1,3-butadiene (isoprene), 2,3-dimethyl-1,3-butadiene, 2-methyl-1,3-pentadiene, chloroprene, 2,3-dimethyl-1,3-pentadiene, 2-methyl-3-ethyl-1,3-pentadiene, 2-methoxybutadiene, 2-phenylbutadiene, and the like. The above conjugated dienes can be polymerized either alone or in admixture with each other and/or with one or more other compounds containing an active $CH_2=C<$ group which are copolymerizable therewith. Included among these latter compounds are aliphatic 1-olefins having up to and including 8 carbon atoms per molecule, such as ethylene, propylene, 1-butene, 1-hexene and 1-octene. Branched chain olefins, such as isobutylene, can be employed as well as 1,1-dialkyl-substituted and 1,2-dialkyl-substituted ethylenes, such as butene-2-pentene-2, hexene-2, heptene-2, 2-methylbutene-1, 2-methylhexene-1, 2-ethylheptene-1, and the like. Other olefins which can be employed include di- and polyolefins, such as 1,5-hexadiene, 1,4-pentadiene, and 1,4,7-octatriene, and cyclic olefins, such as cyclohexene. Other examples of compounds containing an active $CH_2=C<$ group which are copolymerizable with one or more of the conjugated dienes are styrene, divinylbenzene, 3-vinyltoluene, 1-vinylnaphthalene, 3-methylbenzene, acrylonitrile, methacrylonitrile, methylacrylate, methacrylate, vinylacetate, vinylchloride, 2-methyl-5-vinylpyridine, 2-vinylpyridine, and the like.

By our invention, we have provided a process for the production of woven thermoplastic materials wherein sheeted split fibers of thermoplastic materials oriented in a longitudinal direction are interlaced with threads, yarns, or filaments in a transverse direction.

A better understanding of the invention can be had by referring to the drawing. As illustrated therein, a sheeted split-fiber thermoplastic material 10 is oriented and passed from feed roller 11 to take-up roller 12. Various methods can be employed to form the split-fiber thermoplastic material 10. A suitable method is disclosed in U.S. Patent 3,003,304. As therein disclosed, a highly oriented sheet of thermoplastic material is disintegrated by subjecting the sheeted material to a mechanical treatment such as striking, rubbing, brushing, or vibrating. The disintegration or fibrillation operation is discontinued at an intermediate state at which the thermoplastic material is still coherent, forming a network of interconnected fibers.

As the thermoplastic material 10 comprised of a web of split fibers, said fibers attached to adjacent fibers, is passed between rollers 11 and 12, a shed is produced by multiple U-shaped fingers 18, 20, 22, 24 pushing upwardly through the highly oriented thermoplastic material 10. Although four fingers have been employed to produce the shed, it is within the scope of this invention to employ additional fingers or fewer fingers, depending upon the width of the thermoplastic material and the particular weave to be produced. The fingers can operate as lifting fingers, depressing fingers, or a combination thereof in formation of the shed. Preferably, the fingers employed to produce the shed are U-shaped as illustrated in FIGURE 2, although other methods of feeding and forming the shed as illustrated in U.S. Patent 1,541,000 can be employed. The U-shaped fingers have been found to be particularly adaptable in the separation of the split fibers and formation of the shed, requiring minimum elevation and resultant elastic expansion of the split fibers to provide a definite and well-defined shed.

After formation of the shed is complete, the weft 14 is passed through the shed by means of a weft carrier 16. The weft carrier 16 can be attached to a reciprocating weaving machine or other machine known in the weaving industry for interweaving weft yarn with a warp. The weft 14 can be a single yarn or a plurality of yarns. The weft yarns can be spaced apart as illustrated at 17. The weft can comprise any material fibers such as thread, yarn, glass filaments and other materials conventionally employed in the production of woven fabric materials. In addition thereto, the weft can comprise thermoplastic fibers.

As soon as the weft carrier 16 has passed completely through the shed across the width of the web, the fingers are withdrawn from the web. Upon withdrawal of the fingers, the tension is removed from the fibers which form the shed and these fibers contract back into the main web drawing the weft yarn close to the web.

As illustrated, on the first pass of the carrier all the even numbered fingers have pushed through the web of thermoplastic material to form the shed. On the second pass of the carrier, all of the odd numbered fingers 19, 21, 23 and 25 pass through the web. In this way, an interlacing of weft yarns with the web is effected. It will be readily recognized by those skilled in the art that this provides a weave known as a plain weave. It is within the skill of the art to adapt the process of this invention to the production of any known kind of weave to include frills, sateens, and complex jacquard patterns. The particular weave pattern is accomplished by selecting the fingers which will push through the web to form the shed.

As will be evident to those skilled in the art, various modifications of this invention can be made, or followed, in the light of the foregoing disclosure, without departing from the spirit or scope thereof.

We claim:
1. Process for weaving a fabric from a web of orientable thermoplastic material comprising:
   highly orienting said web in one direction;
   incompletely fibrillating said oriented web whereby a coherent web of inter-connected fibers is formed;
   forming a shed in said incompletely fibrillated web by raising out of the plane of the incompletely fibrillated web along a line normal to the direction of orientation alternating sections of said web whereby said incompletely fibrillated web is split along the lines of orientation;
   passing a weft strand through said shed; and closing said shed.
2. Process of claim 1 wherein said orientable thermoplastic is selected from homopolymers and copolymers of mono-1-olefins and homopolymers and copolymers of conjugated dienes.

References Cited by the Examiner

UNITED STATES PATENTS

| | | | |
|---|---|---|---|
| 242,010 | 5/1881 | MacLellan et al. | 139—28 X |
| 1,540,999 | 6/1925 | Riley | 139—28 |
| 1,713,665 | 5/1929 | Larsen | 139—420 X |
| 1,790,983 | 2/1931 | Glover | 28—77 |
| 1,862,687 | 6/1932 | Larsen | 139—11 |
| 2,297,440 | 9/1942 | Szucs | 28—72.2 X |
| 2,596,246 | 5/1952 | Johnson et al. | 28—1.2 |
| 2,704,878 | 3/1955 | Green | 139—420 X |
| 2,954,587 | 10/1960 | Rasmussen | 28—1.2 |
| 3,068,547 | 12/1962 | L'Hommedieu | 19—161 X |
| 3,081,519 | 3/1963 | Blades et al. | 57—140 |
| 3,145,446 | 8/1964 | Sussman | 28—72 |
| 3,168,802 | 2/1965 | Linke et al. | 57—140 |
| 3,169,899 | 2/1965 | Steuber. | |
| 3,177,557 | 4/1965 | White | 28—72 |

FOREIGN PATENTS

| | | |
|---|---|---|
| 636,980 | 10/1936 | Germany. |
| 864,695 | 4/1961 | Great Britain. |
| 98,780 | 10/1961 | Norway. |
| 137,471 | 4/1960 | Russia. |

MERVIN STEIN, *Primary Examiner.*

DONALD W. PARKER, *Examiner.*

J. KEE CHI, *Assistant Examiner.*